(12) United States Patent
Qin et al.

(10) Patent No.: US 11,551,330 B2
(45) Date of Patent: Jan. 10, 2023

(54) SYSTEMS AND METHODS FOR GENERATING PANORAMA IMAGE

(71) Applicant: ZHEJIANG DAHUA TECHNOLOGY CO., LTD., Zhejiang (CN)

(72) Inventors: Chuan Qin, Hangzhou (CN); Chengzhe Meng, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 243 days.

(21) Appl. No.: 16/870,945

(22) Filed: May 9, 2020

(65) Prior Publication Data

US 2020/0273149 A1   Aug. 27, 2020

Related U.S. Application Data

(63) Continuation of application No. PCT/CN2018/114297, filed on Nov. 7, 2018.

(30) Foreign Application Priority Data

Nov. 9, 2017   (CN) .......................... 201711098923.5

(51) Int. Cl.
*G06T 3/40* (2006.01)
*G06T 7/70* (2017.01)
(Continued)

(52) U.S. Cl.
CPC .......... *G06T 3/4038* (2013.01); *G06T 3/4007* (2013.01); *G06T 3/60* (2013.01);
(Continued)

(58) Field of Classification Search
CPC ....... G06T 3/4038; G06T 3/4007; G06T 3/60; G06T 7/70; G06T 3/005; G06T 3/0031; G06T 5/50; H04N 5/23238; H04N 13/207
(Continued)

(56) References Cited

U.S. PATENT DOCUMENTS

2005/0049788 A1   3/2005   Haider
2012/0274739 A1   11/2012   Li
(Continued)

FOREIGN PATENT DOCUMENTS

CN   103247020 A   8/2013
CN   106303283 A   1/2017
(Continued)

OTHER PUBLICATIONS

Extended European Search Report in European Application No. 18876495.5 dated Oct. 7, 2020, 10 pages.
(Continued)

*Primary Examiner* — Ayodeji O Ayotunde
(74) *Attorney, Agent, or Firm* — Metis IP LLC

(57) ABSTRACT

The present disclosure relates to image processing systems and methods. The method may include obtaining a first image and a second image. The first image may be captured by a first camera lens of a panorama device and the second image may be captured by a second camera lens of the panorama device. The method may also include performing an interpolation based on a center of the first image to obtain a first rectangular image, and performing an interpolation based on a center of the second image to obtain a second rectangular image. The method may further include generating a fused image based on the first rectangular image and the second rectangular image, and mapping the fused image to a spherical panorama image.

20 Claims, 12 Drawing Sheets

(51) Int. Cl.
*H04N 13/207* (2018.01)
*G06T 3/60* (2006.01)
*H04N 5/232* (2006.01)

(52) U.S. Cl.
CPC ........... *G06T 7/70* (2017.01); *H04N 5/23238* (2013.01); *H04N 13/207* (2018.05); *G06T 2207/20221* (2013.01)

(58) Field of Classification Search
USPC ........................................................ 382/100
See application file for complete search history.

(56) References Cited

U.S. PATENT DOCUMENTS

2015/0264259 A1* 9/2015 Raghoebardajal ........................... H04N 5/23238
348/36

2016/0078311 A1* 3/2016 Matsumoto ............... G06T 3/60
382/206
2016/0269632 A1 9/2016 Morioka
2017/0046820 A1* 2/2017 Steel ..................... G06T 3/0043

FOREIGN PATENT DOCUMENTS

| | | |
|---|---|---|
| CN | 106357976 A | 1/2017 |
| CN | 107169926 A | 9/2017 |
| WO | 2019091391 A1 | 5/2019 |

OTHER PUBLICATIONS

International Search Report in PCT/CN2018/114297 dated Feb. 12, 2019, 5 pages.
Written Opinion in PCT/CN2018/114297 dated Feb. 12, 2019, 5 pages.

* cited by examiner

1010

—1012

1020

—1022

SYSTEMS AND METHODS FOR GENERATING PANORAMA IMAGE

CROSS-REFERENCE TO RELATED APPLICATIONS

This application is a continuation of International Application No. PCT/CN2018/114297, filed on Nov. 7, 2018, which claims priority to Chinese Application No. 201711098923.5, filed on Nov. 9, 2017, the entire contents of which are hereby incorporated by reference.

TECHNICAL FIELD

The present disclosure generally relates to image processing, and in particular, to systems and methods for generating a panorama image.

BACKGROUND

Video surveillance is very important in security fields. Video surveillance is widely used in many occasions, such as road, shopping mall, residential area, parking lot, etc. due to it is accurate, timely, and informative. In recent years, with the advancement of technology, video surveillance techniques have been developed rapidly. In some cases, a monocular camera may be used as a surveillance camera. However, the field of view (FOV) of a monocular camera is relatively small, which may be difficult to capture a wide-range image (e.g., a panorama image). Thus, a panorama device (e.g., a binocular camera) may be applied to generate panorama images, which may provide a good sense of immersion. However, a spherical panorama image generated according to traditional approach may result in fusion failure, which may have poor user experience. Thus, the traditional approach of generating spherical panorama image should be improved and/or modified.

SUMMARY

In one aspect of the present disclosure, an image processing system for generating a spherical panorama image is provided. The image processing system may include at least one storage device and at least one processor in communication with the at least one storage device. The at least one storage device may include a set of instructions. When executing the set of instructions, the at least one processor may be configured to cause the system to obtain a first image and a second image. The first image may be captured by a first camera lens of a panorama device and the second image may be captured by a second camera lens of the panorama device. The at least one processor may be further configured to cause the system to perform an interpolation based on a center of the first image to obtain a first rectangular image. A top side of the first rectangular image may correspond to the center of the first image. The at least one processor may also be configured to cause the system to perform an interpolation based on a center of the second image to obtain a second rectangular image. A bottom side of the second rectangular image may correspond to the center of the second image. The at least one processor may also be configured to cause the system to generate a fused image based on the first rectangular image and the second rectangular image, and map the fused image to a spherical panorama image.

In some embodiments, the first camera lens and the second camera lens may be arranged oppositely. The first camera lens may correspond to a forward direction and the second camera lens may correspond to a backward direction.

In some embodiments, a field of view (FOV) of the first camera lens may exceed 180°, and a FOV of the second camera lens may exceed 180°.

In some embodiments, the at least one processor may be configured to cause the system to determine one or more location parameters of the first image. The center of the first image may correspond to a forward direction. A top, a bottom, a left and a right of the first image may correspond to northward, southward, western and eastern, respectively. The at least one processor may be further configured to cause the system to determine one or more location parameters of the second image. The center of the first image may correspond to a backward direction. A top, a bottom, a left and a right of the second image may correspond to northward, southward, eastern and western, respectively.

In some embodiments, the top side of the first rectangular image may correspond to the forward direction; a bottom side of the first rectangular image may correspond to western, northward, eastern, and southward; the bottom side of the second rectangular image may correspond to the backward direction; and a top side of the second rectangular image may correspond to western, northward, eastern, and southward.

In some embodiments, to generate a fused image, the at least one processor may be configured to cause the system to stitch a bottom side of the first rectangular image and a top side of the second rectangular image to generate a stitched image, the stitched image including a stitching region, and fuse the stitching region of the stitched image to generate the fused image.

In some embodiments, the bottom side of the first rectangular image and the top side of the second rectangular image correspond to a same direction.

In some embodiments, to map the fused image to a spherical panorama image, the at least one processor may be configured to cause the system to determine a mapping relationship between a two-dimensional (2D) coordinate system and a spherical coordinate system, and map the fused image to the spherical panorama image according to the mapping relationship.

In some embodiments, the at least one processor may be further configured to cause the system to rotate the spherical panorama image with 90° such that a top vertex of the spherical panorama image corresponds to northward and a bottom vertex of the spherical panorama image corresponds to southward.

In some embodiments, an aspect ratio of the first rectangular image is or substantially is 2:0.5, and/or an aspect ratio of the second rectangular image is or substantially is 2:0.5.

In another aspect of the present disclosure, an image processing method is provided. The image processing method may be implemented on a computing device having at least one processor, at least one computer-readable storage medium, and a communication platform connected to a network. The method may include obtaining a first image and a second image. The first image may be captured by a first camera lens of a panorama device and the second image may be captured by a second camera lens of the panorama device. The method may also include performing an interpolation based on a center of the first image to obtain a first rectangular image. A top side of the first rectangular image may correspond to the center of the first image. The method may further include performing an interpolation based on a center of the second image to obtain a second rectangular image. A bottom side of the second rectangular image may correspond to the center of the second image. The method may further include generating a fused image based on the first rectangular image and the second rectangular image and mapping the fused image to a spherical panorama image.

In another aspect of the present disclosure, a non-transitory computer-readable storage medium is provided. The non-transitory computer-readable storage medium may include at least one set of instructions. When executed by at least one processor of a computing device, the at least one set of instructions may direct the at least one processor to perform acts of obtaining a first image and a second image, wherein the first image is captured by a first camera lens of a panorama device and the second image is captured by a second camera lens of the panorama device; performing an interpolation based on a center of the first image to obtain a first rectangular image, a top side of the first rectangular image corresponding to the center of the first image; performing an interpolation based on a center of the second image to obtain a second rectangular image, a bottom side of the second rectangular image corresponding to the center of the second image; generating a fused image based on the first rectangular image and the second rectangular image; and mapping the fused image to a spherical panorama image.

In another aspect of the present disclosure, an image processing system for generating a spherical panorama image is provided. The system may include an acquisition module configured to obtain a first image and a second image. The first image may be captured by a first camera lens of a panorama device and the second image may be captured by a second camera lens of the panorama device. The system may also include an interpolation module configured to perform an interpolation based on a center of the first image to obtain a first rectangular image, and perform an interpolation based on a center of the second image to obtain a second rectangular image. A top side of the first rectangular image may correspond to the center of the first image. A bottom side of the second rectangular image may correspond to the center of the second image. The system may further include a stitching and fusing module configured to generate a fused image based on the first rectangular image and the second rectangular image. The system may further include a generation module configured to map the fused image to a spherical panorama image.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting schematic embodiments, in which like reference numerals represent similar structures throughout the several views of the drawings, and wherein.

DETAILED DESCRIPTION

Figure 1:
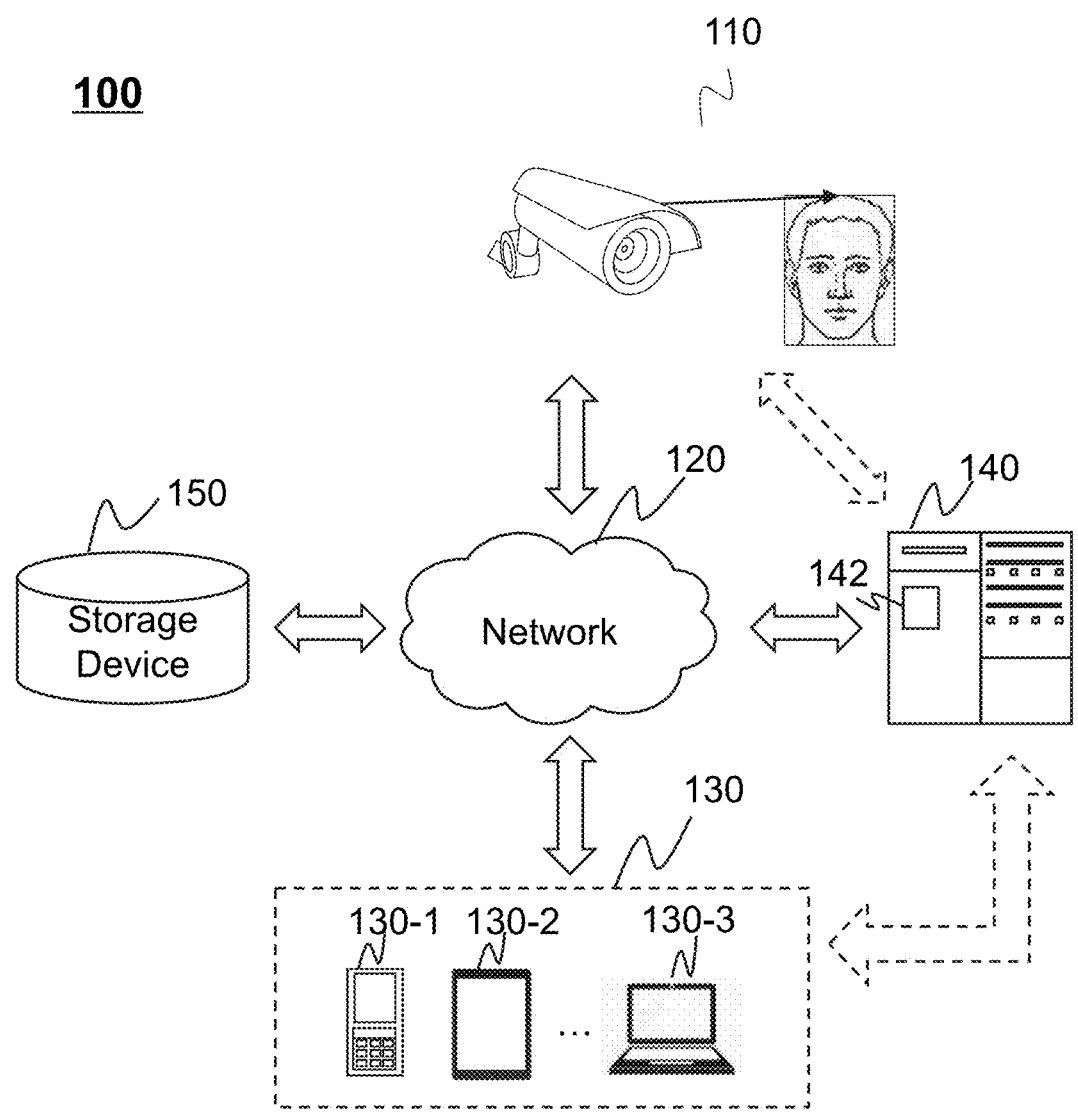
FIG. 1 is a schematic diagram illustrating an exemplary image processing system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a", "an", and "the" may be intended to include the plural forms as well, unless the context clearly indicates otherwise. It will be further understood that the terms "comprise", "comprises", and/or "comprising", "include", "includes", and/or "including", when used in this specification, specify the presence of stated features, integers, steps, operations, elements, and/or components, but do not preclude the presence or addition of one or more other features, integers, steps, operations, elements, components, and/or groups thereof.

It will be understood that the term "system," "unit," "module," and/or "block" used herein are one method to distinguish different components, elements, parts, section or assembly of different level in ascending order. However, the terms may be displaced by another expression if they achieve the same purpose.

The modules (or units, blocks, units) described in the present disclosure may be implemented as software and/or hardware modules and may be stored in any type of non-transitory computer-readable medium or other storage device. In some embodiments, a software module may be compiled and linked into an executable program. It will be appreciated that software modules can be callable from other modules or from themselves, and/or can be invoked in response to detected events or interrupts. Software modules configured for execution on computing devices can be provided on a computer readable medium, such as a compact disc, a digital video disc, a flash drive, a magnetic disc, or any other tangible medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedded in a firmware, such as an EPROM. It will be further appreciated that hardware modules (e.g., circuits) can be included of connected or coupled logic units, such as gates and flip-flops, and/or can be included of programmable units, such as programmable gate arrays or processors. The modules or computing device functionality described herein are preferably implemented as hardware modules, but can be software modules as well. In general, the modules described herein refer to logical modules that can be combined with other modules or divided into units despite their physical organization or storage.

Generally, the word "module," "sub-module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or from themselves, and/or may be invoked in response to detected events or interrupts.

Software modules/units/blocks configured for execution on computing devices may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in a firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure.

Figure 11:
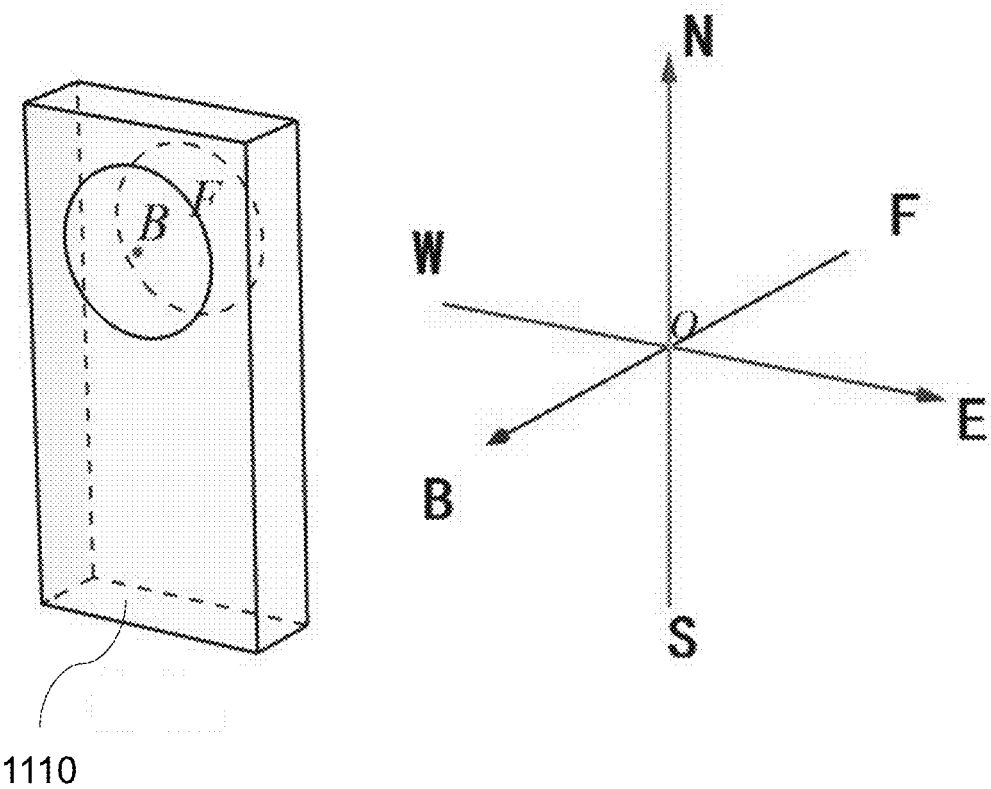
FIG. 11 shows an exemplary panorama device according to some embodiments of the present disclosure.
Figure 12:
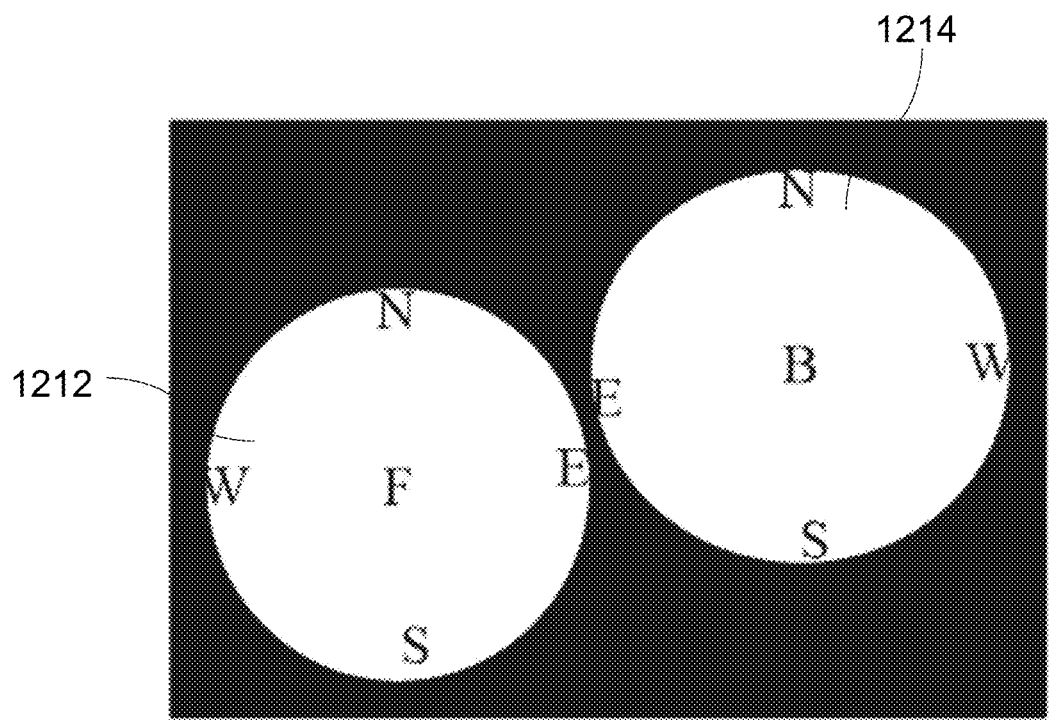
FIG. 12 shows two circular images on a black background according to some embodiments of the present disclosure.

A panorama image may be generated according to the following approach. Merely by way of example, FIG. 11 shows an exemplary panorama device according to some embodiments of the present disclosure. As shown in FIG. 11, the panorama device 1110 may include two camera lenses, i.e., a forward camera lens (marked with F) and a backward camera lens (marked with B). The forward camera lens and the backward camera lens may be fisheye lenses. The field of view (FOV) of the forward camera lens and/or the backward camera lens may exceed 180°. Each camera lens may correspond to a sensitive plate. As shown in FIG. 11, the panorama device 1110 may include six spatial directions, that is, backward (B), forward (F), northward (N), southward (S), western (W), and eastern (E). In some embodiments, the spatial directions of panorama device 1110 may be calibrated using a gyroscope, and may form a three-dimensional (3D) coordinate system (e.g., the 3D coordinate system illustrated in FIG. 14). When the panorama device 1110 is imaged, two images may be captured by the two camera lenses respectively. In general, the two images may be shown as two circular images on a black background (e.g., image 1212 and image 1214 shown in FIG. 12). In some embodiments, the location parameters of the two images may be determined according to the six spatial directions (or the 3D coordinate system) of the panorama device 1110. Merely by way of example, for a first image (i.e., image 1212) corresponding to the forward camera lens, the center of the first image (image 1212) may be marked as F. The top, bottom, left and right of the first image (image 1212) may be marked as N, S, W, E, respectively. For a second image (i.e., image 1214) corresponding to the backward camera lens, the center of the second image (image 1214) may be marked as B. The top, bottom, left and right of the second image (image 1214) may be marked as N, S, E, W, respectively.

Figure 13A:
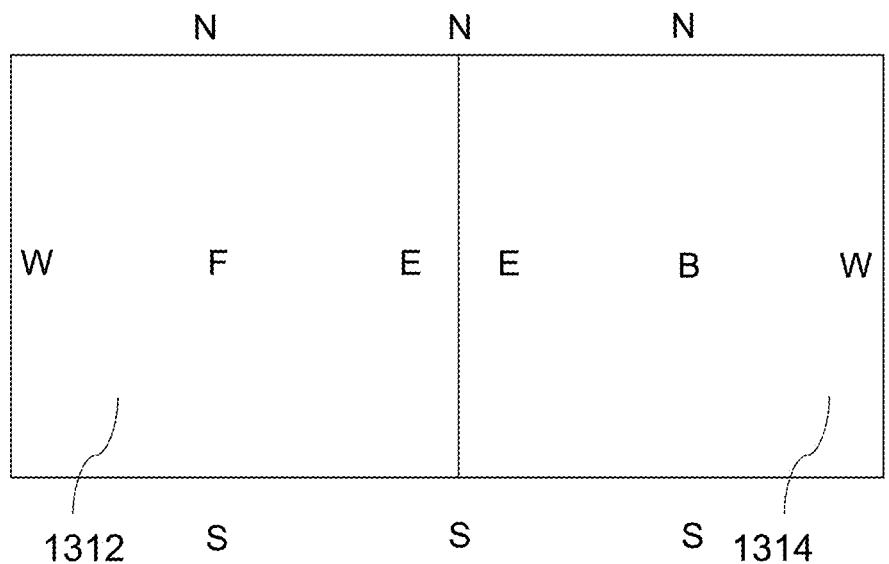
FIG. 13A shows a stitched image according to some embodiments of the present disclosure.
Figure 13B:
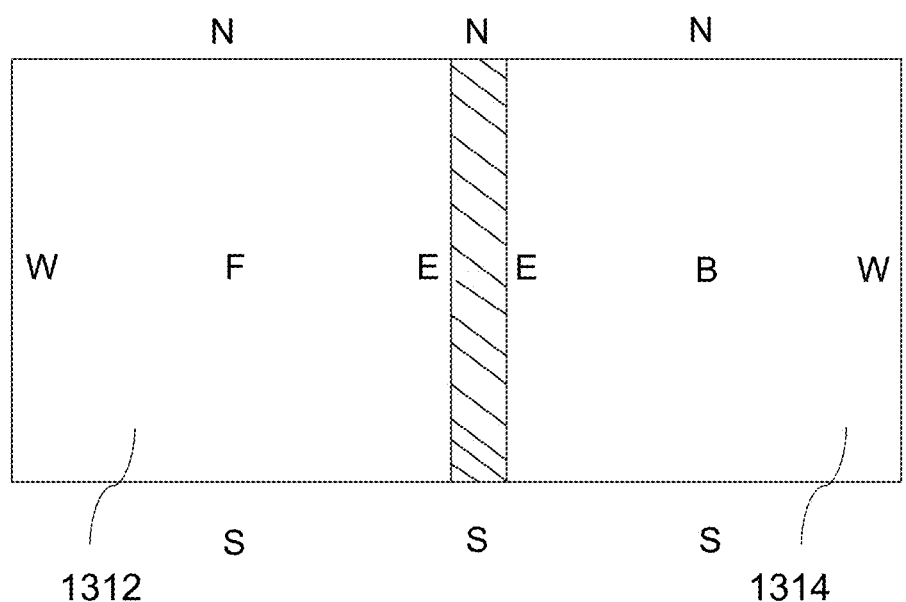
FIG. 13B shows a fused image according to some embodiments of the present disclosure.
Figure 14:
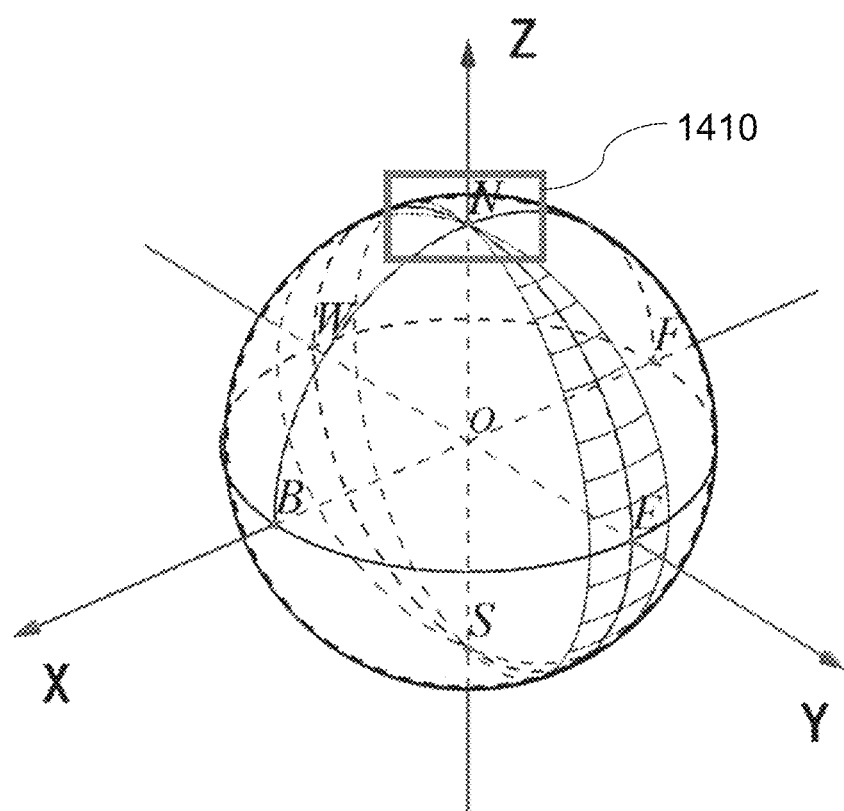
FIG. 14 shows an exemplary spherical panorama image according to some embodiments of the present disclosure.

An interpolation may be performed on the first image and the second image to generate two square images (a first square image 1312 and a second square image 1314) whose aspect ratio are 1:1. The two square images may be stitched to generate a stitched image. As shown in FIG. 13A, the right (E) of the first square image 1312 may be stitched with the left (E) of the second square image 1314. A first stitching seam may be formed when stitching the right (E) of the first square image 1312 and the left (E) of the second square image 1314. The first stitching seam should be eliminated or reduced. In some embodiments, a buffer distance d may be determined on the left and right of the first stitching seam, which may form a first stitching region (e.g., the shaded region shown in FIG. 13B). The first stitching region may be fused to make the first stitching seam unobvious. It should be noted that the left (W) of the first square image 1312 may be stitched with the right (W) of the second square image 1314 (not shown in FIGS. 13A and 13B). Thus, a second stitching seam may be formed when stitching the left (W) of the first square image 1312 and the right (R) of the second square image 1314. Similarly, a second stitching region may be fused to make the second stitching seam unobvious. Then, a fused image may be generated. The fused image may be mapped to a spherical panorama image, which is shown in FIG. 14. As shown in FIG. 14, the stitching region(s) (e.g., the first stitching region, the second stitching region) near the top (N) and the bottom (S) of the spherical panorama image may be compressed. For example, the stitching region(s) 1410 at the top (N) of the spherical panorama image may be almost 0. Thus, a stitching seam may exist at the top (N) of the spherical panorama image. Similarly, a stitching seam may exist at the bottom (S) of the spherical panorama image.

The present disclosure relates to systems and methods for generating a panorama image. The panorama image generated in the present disclosure may include less stitching seam than that in the prior art and/or the above approach. The panorama image may be generated using a panorama device. The panorama device may include two camera lens. The systems and methods may obtain a first image and a second image. The first image may be captured by the first camera lens of the panorama device and the second image may be captured by the second camera lens of the panorama device. The systems and methods may perform an interpolation based on a center of the first image to obtain a first rectangular image, and perform an interpolation based on the center of the second image to obtain a second rectangular image. The top side of the first rectangular image may correspond to the center of the first image, and the bottom side of the second rectangular image may correspond to the center of the second image. The systems and methods may generate a fused image based on the first rectangular image and the second rectangular image, and further map the fused image to a spherical panorama image. In some embodiments, the systems and methods may rotate the spherical panorama image with 90° such that the top vertex of the spherical panorama image corresponds to northward and the bottom vertex of the spherical panorama image corresponds to southward.

FIG. 1 is a schematic diagram illustrating an exemplary image processing system 100 according to some embodiments of the present disclosure. The image processing system 100 may include an image capturing device 110, a network 120, a terminal 130, a processing device 140, and a storage device 150.

The image capturing device 110 may be configured to capture one or more images. As used in this application, an image may be a still image, a video, a stream video, or a video frame obtained from a video. The image may be a three-dimensional (3D) image or a two-dimensional (2D) image. The image capturing device 110 may be or include one or more cameras. In some embodiments, the image capturing device 110 may be a digital camera, a video camera, a security camera, a web camera, a smartphone, a tablet, a laptop, a video gaming console equipped with a web camera, a camera with multiple lenses, a camcorder, etc. In some embodiments, the image capturing device 110 may be a panorama device that includes two camera lens. The two camera lens may be arranged oppositely. One of the camera lens may correspond to a forward direction (marked as F), and the other may correspond to a backward direction (marked as B).

The network 120 may facilitate the exchange of information and/or data. In some embodiments, one or more components of the image processing system 100 (e.g., the image capturing device 110, the terminal 130, the processing device 140, the storage device 150) may send information and/or data to another component(s) in the image processing system 100 via the network 120. For example, the processing device 140 may process an image obtained from the image capturing device 110 via the network 120. As another example, the image capturing device 110 may obtain user instructions from the terminal 130 via the network 120. In some embodiments, the network 120 may be any type of wired or wireless network, or combination thereof. Merely by way of example, the network 120 may include a cable network, a wireline network, an optical fiber network, a telecommunications network, an intranet, an Internet, a local area network (LAN), a wide area network (WAN), a wireless local area network (WLAN), a metropolitan area network (MAN), a wide area network (WAN), a public telephone switched network (PSTN), a Bluetooth™ network, a ZigBee™ network, a near field communication (NFC) network, or the like, or any combination thereof. In some embodiments, the network 120 may include one or more network access points. For example, the network 120 may include wired or wireless network access points such as base stations and/or internet exchange points 120-1, 120-2, . . . , through which one or more components of the image processing system 100 may be connected to the network 120 to exchange data and/or information.

The terminal 130 include a mobile device 130-1, a tablet computer 130-2, a laptop computer 130-3, or the like, or any combination thereof. In some embodiments, the mobile device 130-1 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a bracelet, footgear, eyeglasses, a helmet, a watch, clothing, a backpack, an accessory, or the like, or any combination thereof. In some embodiments, the smart mobile device may include a smartphone, a personal digital assistant (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google Glass™, an Oculus Rift™, a HoloLens™, a Gear VR™, etc. In some embodiments, the terminal 130 may remotely operate the image capturing device 110. In some embodiments, the terminal 130 may operate the image capturing device 110 via a wireless connection. In some embodiments, the terminal 130 may receive information and/or instructions inputted by a user, and send the received information and/or instructions to the image capturing device 110 or to the processing device 140 via the network 120. In some embodiments, the terminal 130 may be part of the processing device 140. In some embodiments, the terminal 130 may be omitted.

In some embodiments, the processing device 140 may process data obtained from the image capturing device 110, the terminal 130, or the storage device 150. For example, the processing device 140 may obtain two images captured by the image capturing device 110. The processing device 140 may further process the obtained images to generate a spherical panorama image. The processing device 140 may be a central processing unit (CPU), a digital signal processor (DSP), a system on a chip (SoC), a microcontroller unit (MCU), or the like, or any combination thereof. In some embodiments, the processing device 140 may be a single server or a server group. The server group may be centralized or distributed. In some embodiments, the processing device 140 may be local to or remote from one or more other components of the image processing system 100. For example, the processing device 140 may access information and/or data stored in the image capturing device 110, the terminal 130, and/or the storage device 150 via the network 120. As another example, the processing device 140 may be directly connected to the image capturing device 110, the terminal 130, and/or the storage device 150, to access stored information and/or data. In some embodiments, the processing device 140 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

The storage device 150 may store data and/or instructions. In some embodiments, the storage device 150 may store data or images obtained from the image capturing device 110, the terminal 130 and/or the processing device 140. In some embodiments, the storage device 150 may store data and/or instructions that the processing device 140 may execute or use to perform exemplary methods described in the present disclosure. In some embodiments, the storage device 150 may include a mass storage, removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random-access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the storage device 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 150 may be connected to the network 120 to communicate with one or more components of the image processing system 100 (e.g., the image capturing device 110, the terminal 130, the processing device 140). One or more components in the image processing system 100 may access the data or instructions stored in the storage device 150 via the network 120. In some embodiments, the storage device 150 may be directly connected to or communicate with one or more components in the image processing system 100 (e.g., the image capturing device 110, the terminal 130, the processing device 140). In some embodiments, the storage device 150 may be part of the image capturing device 110, or the processing device 140.

Figure 2:
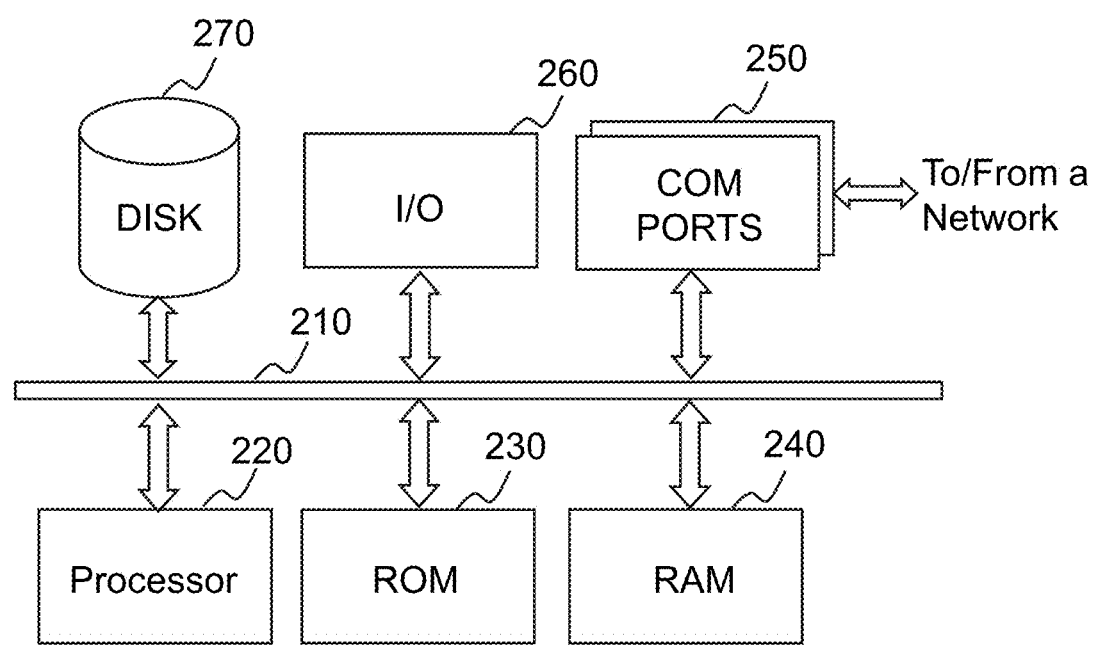
FIG. 2 is a schematic diagram illustrating exemplary hardware and/or software components of a computing device according to some embodiments of the present disclosure.

FIG. 2 is a schematic diagram illustrating exemplary hardware and software components of a computing device 200 according to some embodiments of the present disclosure. In some embodiments, the image capturing device 110, the terminal 130, the processing device 140 may be implemented on the computing device 200. For example, the processing device 140 may be implemented on the computing device 200 and configured to perform functions of the processing device 140 disclosed in this disclosure.

The computing device 200 may be a special purpose computer used to implement an image processing system for the present disclosure. The computing device 200 may be used to implement any component of the image processing system as described herein. For example, the processing device 140 may be implemented on the computing device, via its hardware, software program, firmware, or a combination thereof. Although only one such computer is shown, for convenience, the computer functions relating to the image processing as described herein may be implemented in a distributed fashion on a number of similar platforms, to distribute the processing load.

The computing device 200, for example, may include a COM port 250 connected to and/or from a network connected thereto to facilitate data communications. The computing device 200 may also include a processor 220, in the form of one or more processors (or CPUs), for executing program instructions. The exemplary computing device may include an internal communication bus 210, different types of program storage units and data storage units (e.g., a disk 270, a read only memory (ROM) 230, a random access memory (RAM) 240), various data files applicable to computer processing and/or communication. The exemplary computing device may also include program instructions stored in the ROM 230, RAM 240, and/or other type of non-transitory storage medium to be executed by the processor 220. The method and/or process of the present disclosure may be implemented as the program instructions. The computer device 200 also includes an I/O device 260 that may support the input and/or output of data flows between the computing device 200 and other components. The computing device 200 may also receive programs and data via the communication network.

Merely for illustration, only one CPU and/or processor is described in the computing device 200. However, it should be noted that the computing device 200 in the present disclosure may also include multiple CPUs and/or processors, thus operations and/or method steps that are performed by one CPU and/or processor as described in the present disclosure may also be jointly or separately performed by the multiple CPUs and/or processors. For example, if in the present disclosure the CPU and/or processor of the computing device 200 executes both step A and step B, it should be understood that step A and step B may also be performed by two different CPUs and/or processors jointly or separately in the computing device 200 (e.g., the first processor executes step A and the second processor executes step B, or the first and second processors jointly execute steps A and B).

Figure 3:
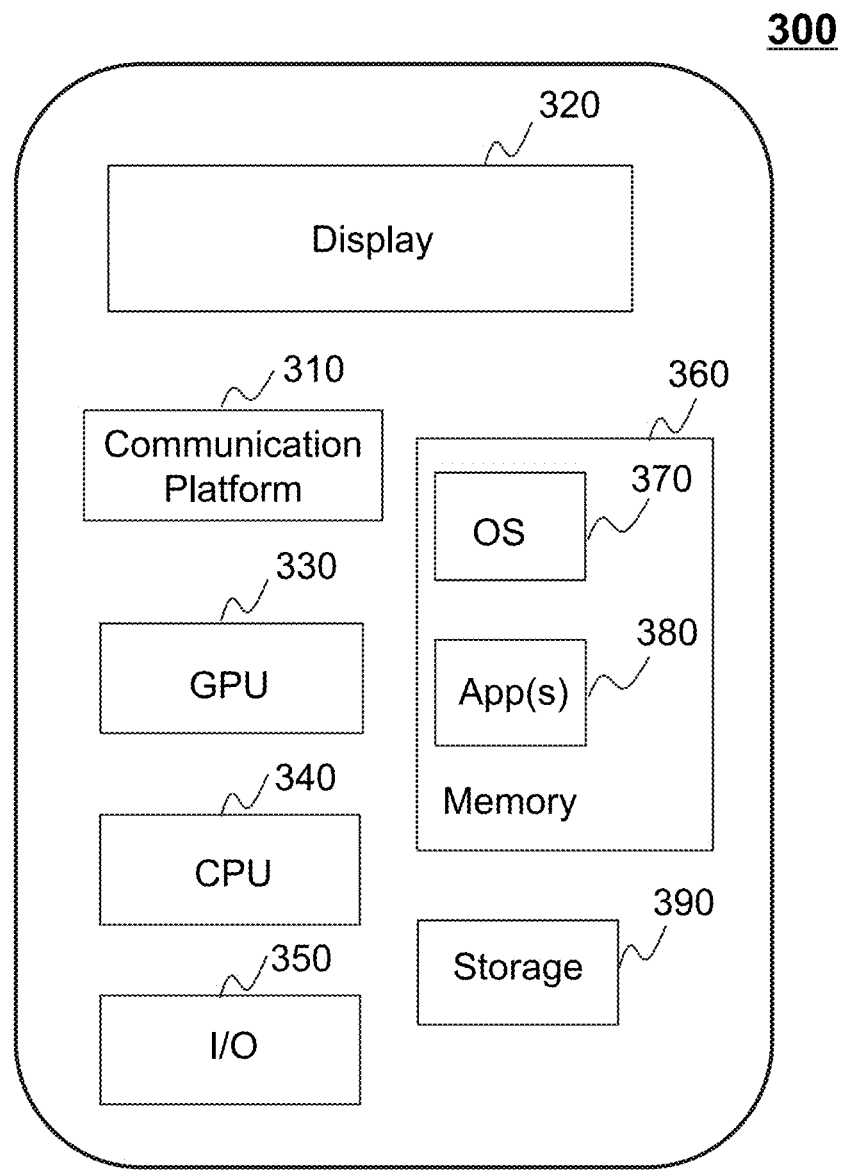
FIG. 3 is a schematic diagram illustrating exemplary hardware and/or software components of a mobile device according to some embodiments of the present disclosure.

FIG. 3 is a schematic diagram illustrating exemplary hardware and/or software components of a mobile device 300 according to some embodiments of the present disclosure. In some embodiments, the mobile device 300 may be an exemplary embodiment corresponding to the terminal 130. As illustrated in FIG. 3, the mobile device 300 may include a communication platform 310, a display 320, a graphic processing unit (GPU) 330, a central processing unit (CPU) 340, an I/O 350, a memory 360, an operating system (OS) 370, a storage 390. In some embodiments, any other suitable component, including but not limited to a system bus or a controller (not shown), may also be included in the mobile device 300.

In some embodiments, an operating system 370 (e.g., iOS™, Android™' Windows Phone™, etc.) and one or more applications 380 may be loaded into the memory 360 from the storage 390 in order to be executed by the CPU 340. The applications 380 may include a browser or any other suitable mobile apps for receiving and rendering information relating to image processing or other information from the image processing system 100. User interactions with the information stream may be achieved via the I/O 350 and provided to the storage device 150, the server 110 and/or other components of the O2O service system 100.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a system if appropriately programmed.

Figure 4:
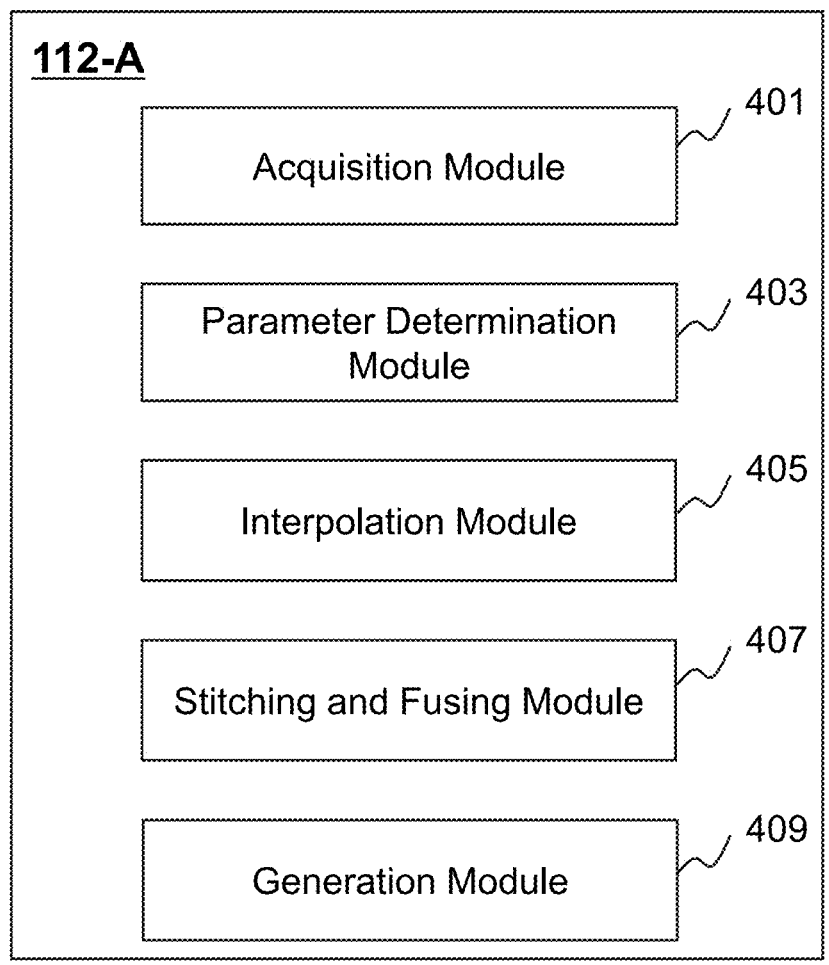
FIG. 4 is a block diagram illustrating an exemplary processing device according to some embodiments of the present disclosure.

FIG. 4 is a block diagram illustrating an exemplary processing device 140 according to some embodiments of the present disclosure. The processing device 140 may include an acquisition module 401, a parameter determination module 403, an interpolation module 405, a stitching and fusing module 407, and a generation module 409. The modules may be hardware circuits of all or part of the processing device 140. The modules may also be implemented as an application or set of instructions read and executed by the processing device 140. Further, the modules may be any combination of the hardware circuits and the application/instructions. For example, the modules may be the part of the processing device 140 when the processing device 140 is executing the application/set of instructions.

The acquisition module 401 may be configured to obtain information and/or data related to the image processing system 100. In some embodiments, the acquisition module 401 may obtain a first image and/or a second image. The first image and/or the second image may be circular images. The first image may be captured by a first camera lens of a panorama device, and the second image may be captured by a second camera lens of the panorama device. Merely by way of example, when a target object is imaged by the panorama device, the first camera lens may generate the first image of the target object and the second camera lens may generate the second image of the target object. The first image and the second image may correspond to two views of the target object. In some embodiments, the acquisition module 401 may obtain the first image and/or the second image from one or more components of the image processing system 100, such as the image capturing device 110, the terminal 130, a storage device (e.g., the storage device 150), or from an external source via the network 120.

The parameter determination module 403 may be configured to determine location parameter(s) of an image. In some embodiments, the parameter determination module 403 may determine one or more location parameters of the first image and/or the second image. In some embodiments, the parameter determination module 403 may determine the location parameter(s) of the first image and/or the second image using a gyroscope. Details regarding the determination of the location parameter(s) may be found elsewhere in the present disclosure (e.g., operation 520 of process 500 and the relevant descriptions thereof).

The interpolation module 405 may be configured to perform an interpolation on the first image and/or the second image. In some embodiments, the interpolation module 405 may perform an interpolation based on the center of the first image to obtain a first rectangular image. The interpolation module 405 may also perform an interpolation based on the center of the second image to obtain a second rectangular image. The aspect of the first rectangular image and/or the second rectangular image may be 2.5 or substantially close to 2:0.5. Details regarding the interpolation of the first image and/or the second image may be found elsewhere in the present disclosure (e.g., operation 530 and operation 540, and the relevant descriptions thereof).

The stitching and fusing module 407 may be configured to generate a fused image based on the first rectangular image and the second rectangular image. In some embodiments, the bottom side of the first rectangular image and the top side of the second rectangular image may correspond to the same direction. The stitching and fusing module 407 may stitch the bottom side of the first rectangular image and the top side of the second rectangular image to generate a stitched image. The stitched image may include a stitching region. The stitching and fusing module 407 may further fuse the stitching region of the stitched image to generate the fused image. Details regarding the generation of the fused image may be found elsewhere in the present disclosure (e.g., FIG. 7 and the descriptions thereof).

The generation module 409 may be configured to map the fused image to a spherical panorama image. In some embodiments, the generation module 409 may determine a mapping relationship between a two-dimensional (2D) coordinate system and a spherical coordinate system. The generation module 409 may map the fused image to the spherical panorama image according to the mapping relationship. In some embodiments, the generation module 409 may further rotate the spherical panorama image with 90° such that the top vertex of the spherical panorama image corresponds to northward (N) and the bottom vertex of the spherical panorama image corresponds to southward (S).

The modules in the processing device 140 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, a single module may be divided into two or more units. For example, the interpolation module 405 may be divided into a first interpolation unit and a second interpolation unit. The first interpolation unit may be configured to perform an interpolation on the first image and the second interpolation unit may be configured to perform an interpolation on the second image. In some embodiments, the processing device 140 may further include one or more additional modules. For example, the processing device 140 may further include a storage module (not shown in FIG. 4) configured to store data generated by the modules of the processing device 140.

Figure 5:
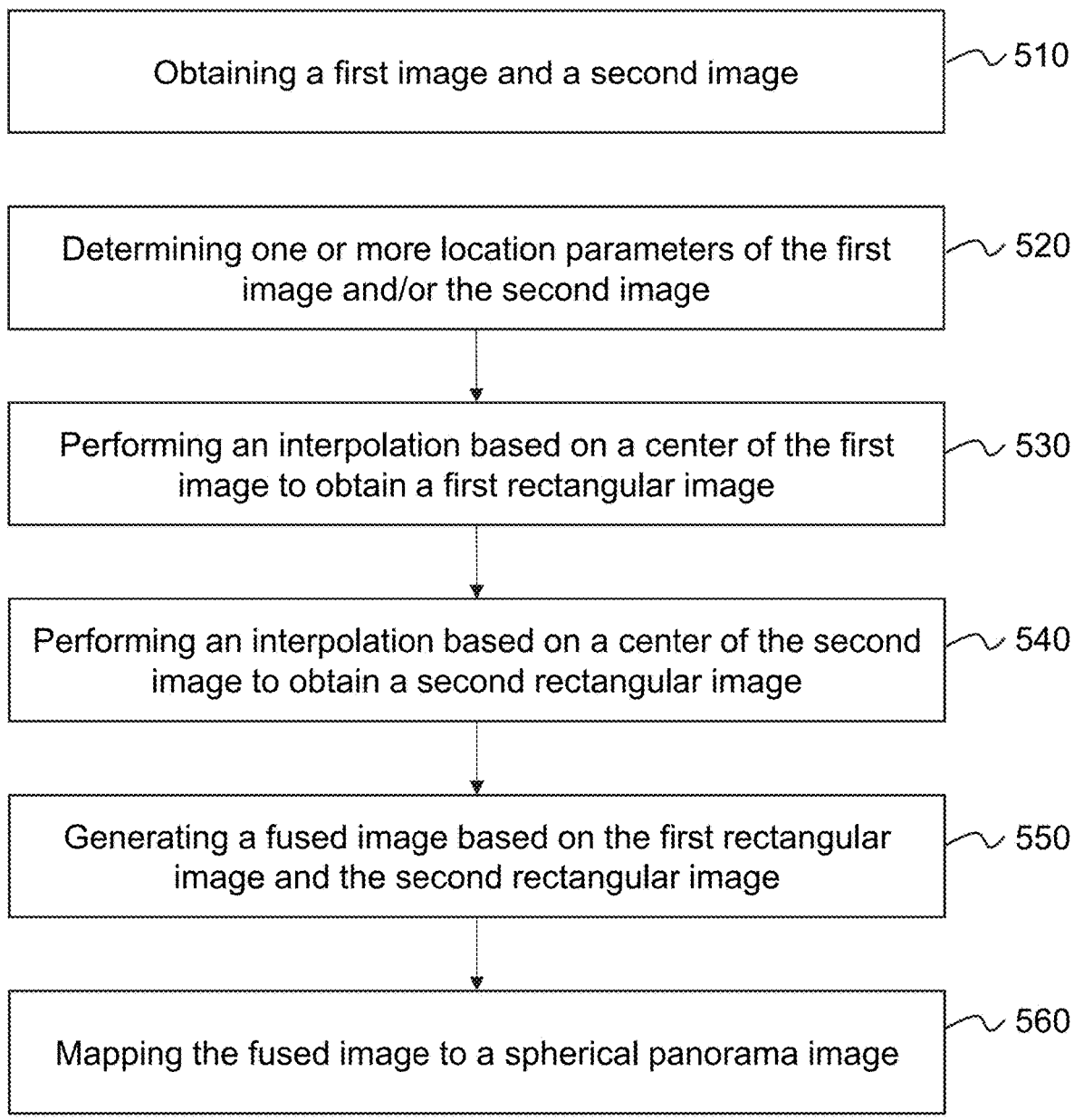
FIG. 5 is a flowchart illustrating an exemplary process for generating a spherical panorama image according to some embodiments of the present disclosure.

FIG. 5 is a flowchart illustrating an exemplary process 500 for generating a spherical panorama image according to some embodiments of the present disclosure. For illustration purpose only, the processing device 140 may be described as a subject to perform the process 500. However, one of ordinary skill in the art would understand that the process 500 may also be performed by other entities. For example, one of ordinary skill in the art would understand that at least a portion of the process 500 may also be implemented on the computing device 200 as illustrated in FIG. 2 or the mobile device 300 as illustrated in FIG. 3. In some embodiments, one or more operations of process 500 may be implemented in the image processing system 100 as illustrated in FIG. 1. In some embodiments, one or more operations in the process 500 may be stored in the storage device 150 and/or the storage (e.g., the ROM 230, the RAM 240, etc.) as a form of instructions, and invoked and/or executed by the processing device 140 (e.g., the processor 220 of the processing device 140, or one or more modules of the processing device 140). In some embodiments, the instructions may be transmitted in a form of electronic current or electrical signals.

In 510, the processing device 140 (e.g., the acquisition module 401) may obtain a first image and a second image. In some embodiments, the first image and/or the second image may be captured by a panorama device. The first image may be captured by a first camera lens of the panorama device, and the second image may be captured by a second camera lens of the panorama device. In some embodiments, the first camera lens may correspond to a first sensitive plate, and the second camera lens may correspond to a second plate. In some embodiments, when a target object is imaged by the panorama device, the first camera lens may generate the first image of the target object and the second camera lens may generate the second image of the target object. The first image and the second image may correspond to two views of the target object.

As shown in FIG. 11, the first camera lens and the second camera lens may be arranged oppositely. The first camera lens may correspond to a forward direction (F), and the second camera lens may correspond to a backward direction (B). The forward direction (F) may refer to an orientation of the first camera lens that is close to the target object. The backward direction (B) may refer to an orientation of the second camera lens that is away from the target object. In some embodiments, the first camera lens and the second camera lens may be fisheye lenses. In some embodiments, the field of view (FOV) of the first camera lens and/or the second camera lens may be greater than 180°. In this cases, a portion of the first image may overlap with a portion of the second image, which may be benefit to image stitching. In some embodiments, the FOV of the first camera lens and/or the second camera lens may be less than 220°. The first image and/or the second image may be circular images. For example, the first image and the second image may be shown as two circular images on a black background (e.g., image 1212 and image 1214 shown in FIG. 12).

In some embodiments, the processing device 140 may obtain the first image and/or the second image from one or more components of the image processing system 100, such as the image capturing device 110, the terminal 130, a storage device (e.g., the storage device 150). Alternatively or additionally, the processing device 140 may obtain the image from an external source via the network 120.

In some embodiments, the first image and the second image may be captured by fisheye lenses. In general, an image captured by a fisheye lens may have distortion, which may be generated due to the large view of the fisheye lens. Specifically, object(s) in the center of the image may have substantially normal shape(s), while object(s) away from the center of the image may be distorted. Thus, the first image and/or the second image may include distortion. The distortion of the first image and/or the second image may need to be eliminated or reduced. In some embodiments, the processing device 140 may perform an interpolation on the first image and/or the second image to eliminate or reduce distortion thereof. Details regarding the interpolation of the first image and the second image may be found elsewhere in the present disclosure (e.g., operations 530 and 540, and the descriptions thereof). In some embodiments, before performing the interpolation on the first image and the second image, spatial location relationships between the first image and the second image may need to be determined.

In 520, the processing device 140 (e.g., the parameter determination module 403) may determine one or more location parameters of the first image and/or the second image.

As shown in FIG. 11, The panorama device 1110 may include six spatial directions, that is, backward (B), forward (F), northward (N), southward (S), western (W), and eastern (E). In some embodiments, the spatial directions of the panorama device 1110 may be calibrated using a gyroscope, and form a three-dimensional (3D) coordinate system (e.g., the 3D coordinate system illustrated in FIGS. 9A and 9B, or in FIG. 14). Specifically, as shown in FIG. 11, there may be a reference object O (e.g., a target object). The vertical direction (e.g., a north-south direction) of the reference object O and the horizontal plane may be determined using the gyroscope. Two perpendicular directions (e.g., a forward-backward direction, an east-west direction) of the reference object O in the horizontal plane may also be determined using the gyroscope. Therefore, the six spatial directions (or the 3D coordinate system) of the panorama device 1110 may be determined. According to the 3D coordinate system (or the six spatial directions), the center of the first image captured by the first camera lens may be calibrated as a forward direction (F). That is, the center of the first image may correspond to the forward direction (F). A top, a bottom, a left, and a right of the first image may be calibrated as northward (N), southward (S), western (W) and eastern (E), respectively. That is, the top, the bottom, the left and the right of the first image may correspond to northward (N), southward (S), western (W) and eastern (E), respectively. Similarly, according to the 3D coordinate system (or the six spatial directions), the center of the second image captured by the second camera lens may be calibrated as a backward direction (B). That is, the center of the second image may correspond to the backward direction (B). A top, a bottom, a left, and a right of the second image may be calibrated as northward (N), southward (S), eastern (E) and western (W), respectively. That is, the top, the bottom, the left and the right of the second image may correspond to northward (N), southward (S), eastern (E) and western (W), respectively.

In 530, the processing device 140 (e.g., the interpolation module 405) may perform an interpolation based on the center of the first image to obtain a first rectangular image. The aspect ratio of the first rectangular image may be 2:0.5 or substantially close to 2:0.5.

In some embodiments, the first image may include a plurality of first pixels, and the rectangular image may include a plurality of second pixels. As described above, the first image may be a circular image. The processing device 140 may establish a mapping relationship between the first image and the rectangular image. Then, the pixel values of the pixels in the rectangular image may be determined according to the mapping relationship and the first image. In some embodiments, the rectangular image may be an undistorted image and have substantially the same image information as the first image. In some embodiments, a second pixel in the rectangular image may not directly correspond to a first pixel in the first image. For example, the second pixel may have a corresponding location in the first image between two first pixels (e.g., the corresponding location of the second pixel may occupy a portion of each of the two first pixels). Therefore, the pixel value of a second pixel in the rectangular image may be determined by interpolation based on the pixel values of first pixels in the first image. In some embodiments, the interpolation may include a nearest neighbor interpolation, a linear interpolation, a bilinear interpolation, a cubic interpolation, a spline interpolation, a Lagrange interpolation, a Newton interpolation, or the like, or any combination thereof.

Figure 6:
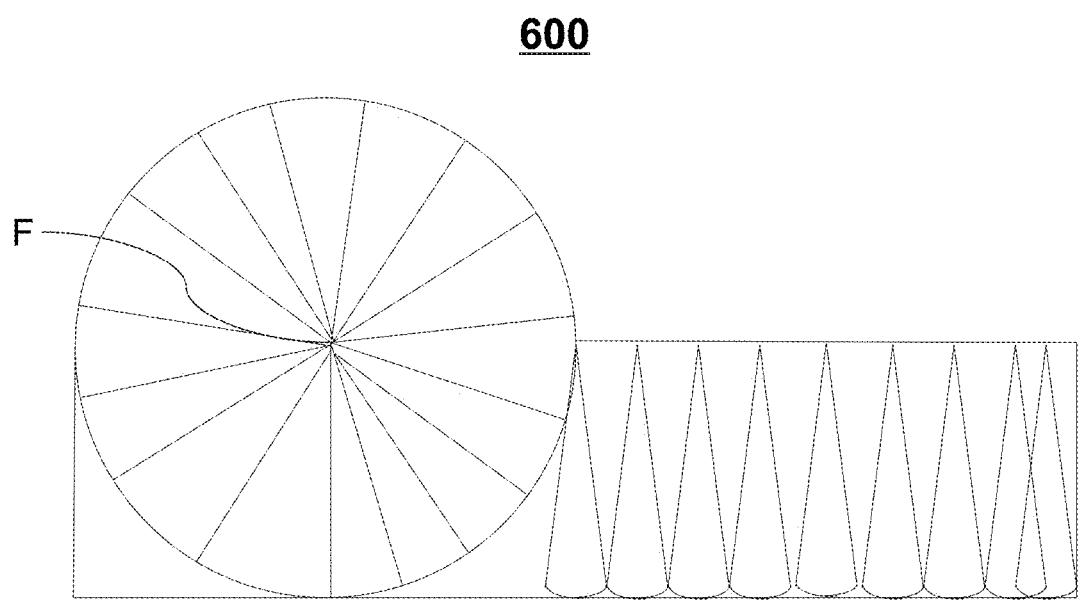
FIG. 6 is a schematic diagram illustrating an exemplary interpolation on an image according to some embodiments of the present disclosure.
Figure 8A:
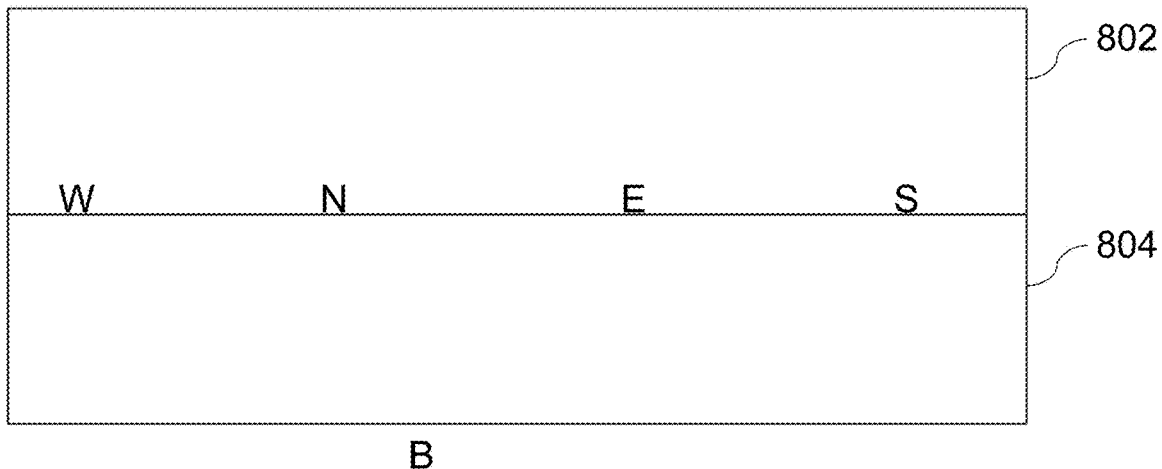
FIG. 8A shows a stitched image according to some embodiments of the present disclosure.

Merely by way of example, FIG. 6 is a schematic diagram illustrating an exemplary interpolation on the first image according to some embodiments of the present disclosure. As shown in FIG. 6, the center F of the first image may be interpolated to obtain a plurality of fan-shaped images. The plurality of fan-shaped images may be arranged in parallel. Then, a rectangular image with an aspect ratio of 2:0.5 or substantially close to 2:0.5 may be formed. A top side of the first rectangular image (e.g., the first long side of the first rectangular image 802 as illustrated in FIG. 8A) may correspond to the center F of the first image. That is, the top side of the first rectangular image may correspond to the forward direction (F). A bottom side of the first rectangular image (e.g., the second long side of the first rectangular image 802 as illustrated in FIG. 8A) correspond to western, northward, eastern, and southward.

In 540, the processing device 140 (e.g., the interpolation module 405) may perform an interpolation based on the center of the second image to obtain a second rectangular image. The aspect ratio of the second rectangular image may be 2:0.5 or substantially close to 2:0.5. In some embodiments, the interpolation on the second image may be performed in a similar manner as that on the first image, and the descriptions thereof are not repeated here. Similarly, the center B of the second image may be interpolated to obtain a plurality of fan-shaped images. The plurality of fan-shaped images may be arranged in parallel. Then, a rectangular image with an aspect ratio of 2:0.5 or substantially close to 2:0.5 may be formed. A bottom side of the second rectangular image (e.g., the second long side of the second rectangular image 804 as illustrated in FIG. 8A) may correspond to the center B of the second image. That is, the bottom side of the second rectangular image may correspond to the backward direction (B). A top side of the second rectangular image (e.g., the first long side of the second rectangular image as illustrated in FIG. 8A) may correspond to western, northward, eastern, and southward.

In 550, the processing device 140 (e.g., the stitching and fusing module 407) may generate a fused image based on the first rectangular image and the second rectangular image. In some embodiments, the bottom side of the first rectangular image and the top side of the second rectangular image may correspond to the same direction, i.e., western, northward, eastern, and southward. The processing device 140 may stitch the bottom side of the first rectangular image and the top side of the second rectangular image to generate a stitched image. The stitched image may include a stitching region. The processing device 140 may further fuse the stitching region of the stitched image to generate the fused image. Details regarding the generation of the fused image may be found elsewhere in the present disclosure (e.g., FIG. 7 and the descriptions thereof).

In 560, the processing device 140 (e.g., the generation module 409) may map the fused image to a spherical panorama image.

Figure 9A:
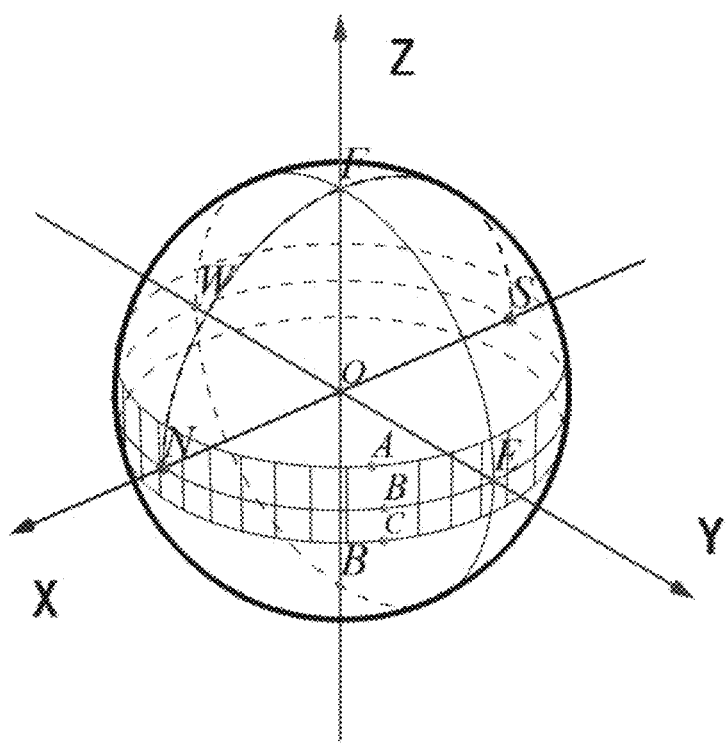
FIGS. 9A and 9B show exemplary spherical panorama images according to some embodiments of the present disclosure.

In some embodiments, the processing device 140 may first determine a mapping relationship between a two-dimensional (2D) coordinate system and a spherical coordinate system. The processing device 140 may map the fused image to the spherical panorama image according to the mapping relationship. In some embodiments, pixels corresponding to the stitching region may be mapped to the equatorial region of the spherical panorama image (e.g., a region near the XY plane of the spherical coordinate system). Merely by way of example, FIG. 9A shows an exemplary spherical panorama image generated based on the fused image. As shown in FIG. 9A, the stitching region corresponding to western (W), northward (N), eastern (E), and southward (S) may be "attached" to a region near the XY plane of the spherical coordinate system (the shaded region between circle A and circle C). A top side of the fused image that corresponds to the forward direction (F) may be mapped and/or compressed to a top vertex (F) of the spherical panorama image. A bottom side of the fused image that corresponds to the backward direction (B) may be mapped and/or compressed to a bottom vertex (F) of the spherical panorama image.

Figure 9B:
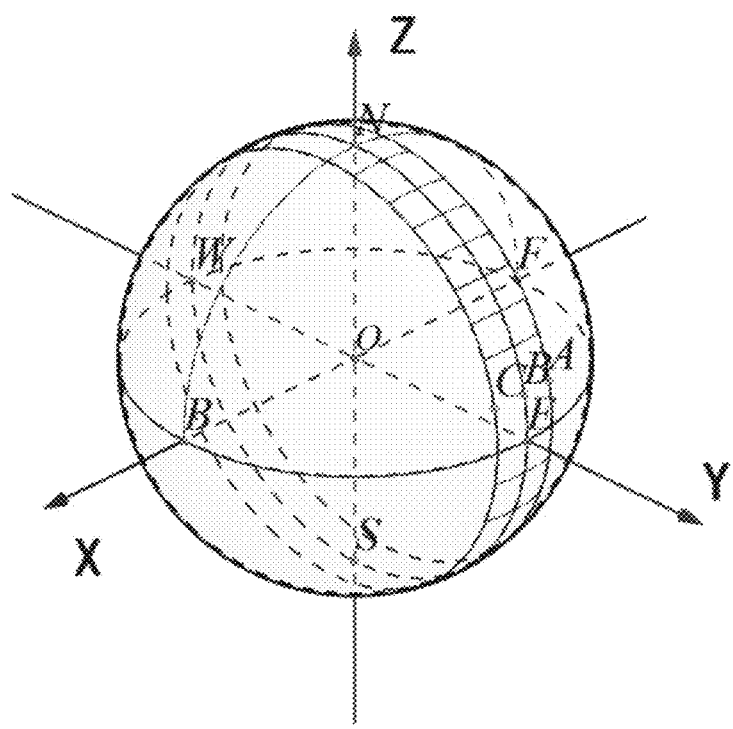

In some embodiments, the processing device 140 map rotate the spherical panorama image with 90° such that the top vertex of the spherical panorama image corresponds to northward (N) and the bottom vertex of the spherical panorama image corresponds to southward (S). FIG. 9B shows an exemplary rotated spherical panorama image according to some embodiments of the present disclosure. As shown in FIG. 9B, the vertical direction (e.g., Z-axis direction) corresponds to a north-south direction. A first horizontal direction (e.g., X-axis direction) corresponds to a forward-backward direction. A second horizontal direction (e.g., Y-axis direction) corresponds to an east-west direction. In this cases, the directions of the spherical panorama image may be the same as the directions of the panorama device 1110, which may not affect the user's experience.

In the present disclosure, two rectangular images with an aspect ratio of 2:0.5 or substantially close to 2:0.5 may be generated by interpolation. The two rectangular images may be stitched to generate a stitched image. Specifically, the bottom side of the first rectangular image and the top side of the second rectangular image may be stitched. Thus, there may be only one stitching region at the center of stitched image. Besides, the stitching region may correspond to the equatorial region of the spherical panorama image (e.g., a region near the XY plane of the spherical coordinate system), which may not be affected by pixel compression near the top and/or bottom of the spherical panorama image. The stitching region may remain unchanged when the fused image is mapped to the spherical panorama image, thus solving the fusion failure. For example, as shown in FIG. 10B, the panorama image 1020 barely includes a stitching seam.

It should be noted that the above description regarding the process 500 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the X-axis direction may correspond to the east-west direction, and the Y-axis direction may correspond to the forward-backward direction. In some embodiments, the location parameter(s) of the first image and/or the second image may be determined based on the characteristic of the panorama device, and thus, operation 520 may be omitted.

Figure 7:
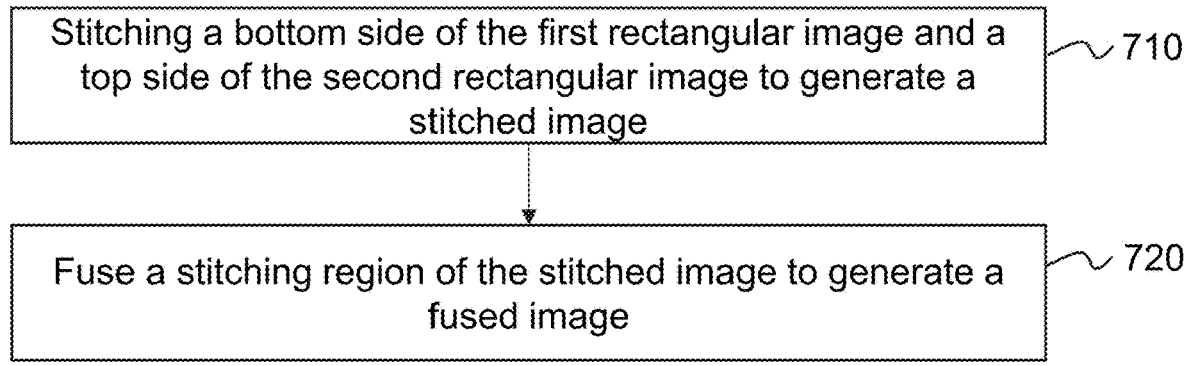
FIG. 7 is a flowchart illustrating an exemplary process for generating a fused image according to some embodiments of the present disclosure.

FIG. 7 is a flow chart illustrating an exemplary process 700 for generating a fused image according to some embodiments of the present disclosure. For illustration purpose only, the processing device 140 may be described as a subject to perform the process 700. However, one of ordinary skill in the art would understand that the process 700 may also be performed by other entities. For example, one of ordinary skill in the art would understand that at least a portion of the process 700 may also be implemented on the computing device 200 as illustrated in FIG. 2 or the mobile device 300 as illustrated in FIG. 3. In some embodiments, one or more operations of the process 700 may be implemented in the image processing system 100 as illustrated in FIG. 1. In some embodiments, one or more operations in the process 700 may be stored in the storage device 150 and/or the storage (e.g., the ROM 230, the RAM 240, etc.) as a form of instructions, and invoked and/or executed by the processing device 140 (e.g., the processor 220 of the processing device 140, or one or more modules of the processing device 140). In some embodiments, the instructions may be transmitted in a form of electronic current or electrical signals. In some embodiments, operation 550 of the process 500 may be performed according to the process 700.

In 710, the processing device 140 (e.g., the stitching and fusing module 407) may stitch a bottom side of the first rectangular image and a top side of the second rectangular image to generate a stitched image. FIG. 8A shows a stitched image generated based on the first rectangular image and the second rectangular image. As shown in FIG. 8A, the bottom side of the first rectangular image 802 and the top side of the second rectangular image 804 correspond to the same direction, i.e., western, northward, eastern, and southward. The bottom side of the first rectangular image 802 and the top side of the second rectangular image 804 may be stitched to generate a stitched image. The top side of the stitched image may correspond to forward direction (F), and the bottom side of the stitched image may correspond to backward direction (B).

As shown in FIG. 8A, a stitching seam may be formed at the center of the stitched image. In order to eliminate or reduce the stitching seam, a stitching region may be determined. In some embodiments, the stitching region may refer to an overlapping region between the first rectangular image and the second rectangular image. For example, a buffer distance d may be determined on the top and bottom of the stitching seam. A region determined by the buffer distance d may be referred to as the stitching region (e.g., the shaded region shown in FIG. 8B). In some embodiments, the buffer distance d may be a default setting of the image processing system 100. For example, the buffer distance d may depend on the performance of the image capturing device 110 (e.g., the panorama device). Alternatively or additionally, the buffer distance d may be preset or adjusted by a user. For example, a user may adjust the buffer distance d based on the overlapping degree of the two rectangular images.

Figure 8B:
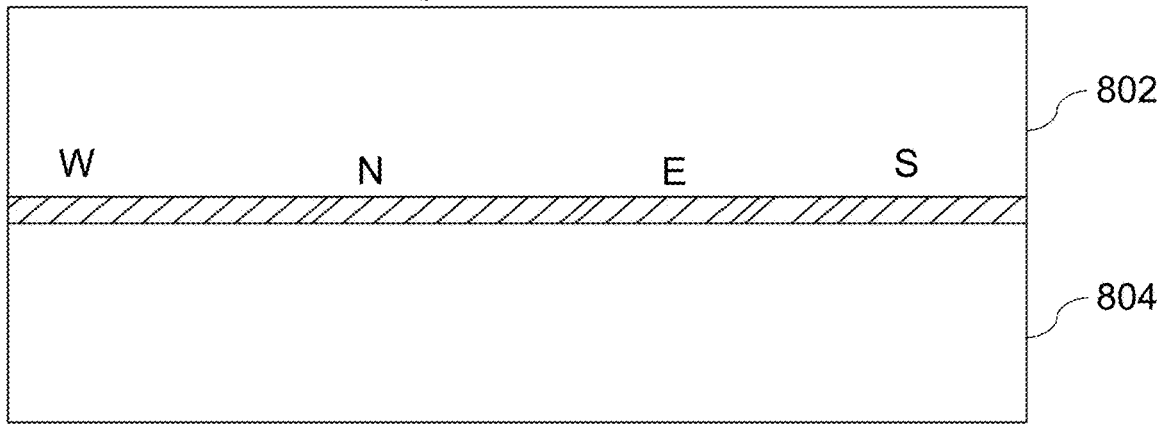
FIG. 8B shows a fused image according to some embodiments of the present disclosure.

In 720, the processing device 140 (e.g., the stitching and fusing module 407) may fuse the stitching region of the stitched image to generate a fused image. In some embodiments, the processing device 140 may perform a smoothing operation on the stitching region to eliminate or reduce the stitching seam. FIG. 8B shows a fused image according to some embodiments of the present disclosure. The fused image may include the stitching region. The stitching region may be fused, and the pixel values of the pixels in the stitching region may change smoothly.

The processing device 140 may fuse the stitching region of the stitched image. Merely by way of example, the stitching region may be an overlapping region between the first rectangular image and the second rectangular image. That is, a pixel in the stitching region may both correspond to a first pixel in the first rectangular image and a second pixel in the second rectangular image. The processing device 140 may assign a first weight for the first pixel in the first rectangular image, and assign a second weight for the second pixel in the second rectangular image. The processing device 140 may determine the pixel value of the pixel based on the first weight and the pixel value of the first pixel and the second weight and the pixel value of the second pixel. In some embodiments, the first weight and the second weight may be the same or different.

In the present disclosure, when the processing device 140 fuse the stitching region, information (or pixel values) in the first rectangular image and the second rectangular image has been considered, which may reduce the difference between the first rectangular image and the second rectangular image.

It should be noted that the above description regarding the process 500 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the processing device 140 may fuse the stitching region using other fusion algorithms.

Figure 10A:
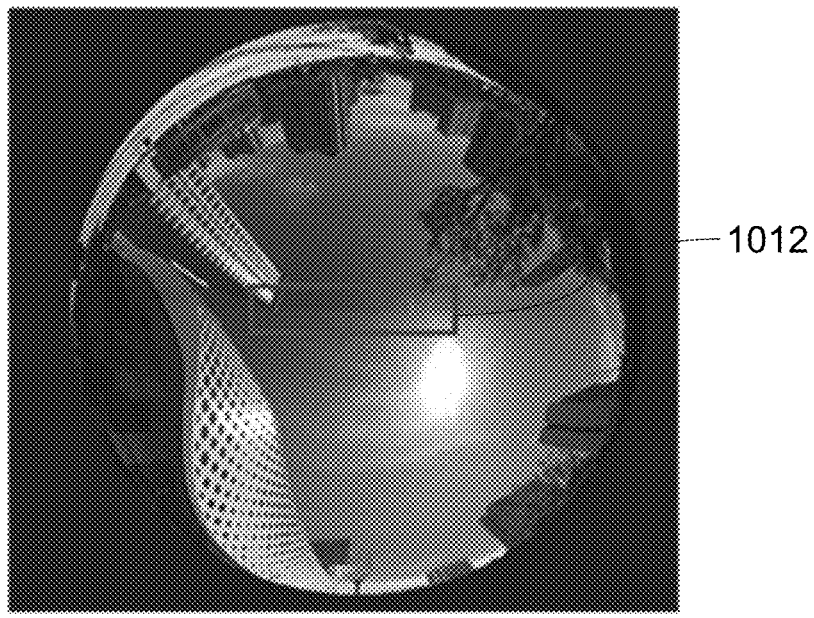
FIGS. 10A and 10B show exemplary panorama images according to some embodiments of the present disclosure.
Figure 10B:
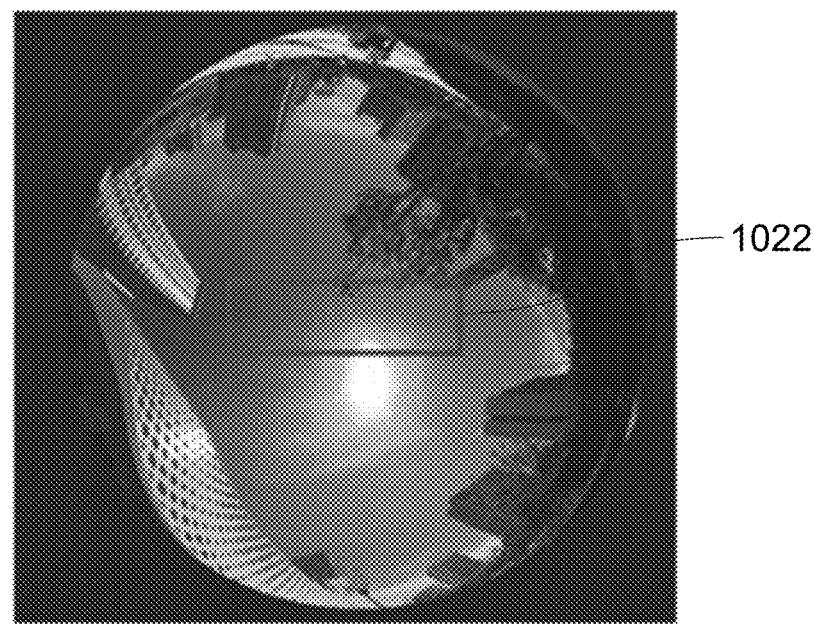

FIG. 10A is a schematic diagram illustrating an exemplary panorama image of a target object generated according to the prior art. FIG. 10B is a schematic diagram illustrating an exemplary panorama image of the same target object generated according to the process disclosed in the present disclosure. As shown in FIGS. 10A and 10B, the panorama image 1010 may include an obvious stitching seam (enclosed by the solid box 1012), while the panorama image 1020 may substantially not have the stitching seam (enclosed by the solid box 1022). Thus, the process described in the present disclosure may solve the fusion failure to some extent, thus making the stitching seam unobvious.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

What is claimed is:

1. An image processing system for generating a spherical panorama image, comprising:
    at least one storage device including a set of instructions;
    at least one processor in communication with the at least one storage device, wherein when executing the set of instructions, the at least one processor is configured to cause the system to:
        obtain a first image and a second image, wherein the first image is captured by a first camera lens of a panorama device and the second image is captured by a second camera lens of the panorama device;
        obtain a first rectangular image by performing an interpolation based on a plurality of first fan-shaped images, wherein a top side of the first rectangular image corresponds to a center of the first image and each one of the plurality of first fan-shaped images is part of the first image;
        obtain a second rectangular image by performing an interpolation based on a plurality of second fan-shaped images, wherein a bottom side of the second rectangular image corresponds to a center of the second image and each one of the plurality of second fan-shaped images is part of the second image;
        generate a fused image based on the first rectangular image and the second rectangular image; and
        map the fused image to a spherical panorama image.

2. The image processing system of claim 1, wherein the first camera lens and the second camera lens are arranged oppositely, the first camera lens corresponding to a forward direction and the second camera lens corresponding to a backward direction.

3. The image processing system of claim 1, wherein
    a field of view (FOV) of the first camera lens exceeds 180°, and
    a FOV of the second camera lens exceeds 180°.

4. The image processing system of claim 1, wherein the at least one processor is configured to cause the system to:
  determine one or more location parameters of the first image, wherein the center of the first image corresponds to a forward direction, a top, a bottom, a left, and a right of the first image correspond to northward, southward, western, and eastern, respectively; and
  determine one or more location parameters of the second image, wherein the center of the second image corresponds to a backward direction, a top, a bottom, a left, and a right of the second image correspond to northward, southward, eastern, and western, respectively.

5. The image processing system of claim 4, wherein
  the top side of the first rectangular image corresponds to the forward direction;
  a bottom side of the first rectangular image corresponds to western, northward, eastern, and southward;
  the bottom side of the second rectangular image corresponds to the backward direction; and
  a top side of the second rectangular image corresponds to western, northward, eastern, and southward.

6. The image processing system of claim 1, wherein to generate a fused image, the at least one processor is configured to cause the system to:
  generate a stitched image by stitching a bottom side of the first rectangular image and a top side of the second rectangular image, the stitched image including a stitching region; and
  generate the fused image by fusing the stitching region of the stitched image.

7. The image processing system of claim 6, wherein the bottom side of the first rectangular image and the top side of the second rectangular image correspond to a same direction.

8. The image processing system of claim 1, wherein to map the fused image to a spherical panorama image, the at least one processor is configured to cause the system to:
  determine a mapping relationship between a two-dimensional (2D) coordinate system and a spherical coordinate system; and
  map the fused image to the spherical panorama image according to the mapping relationship.

9. The image processing system of claim 1, wherein the at least one processor is further configured to cause the system to:
  rotate the spherical panorama image with 90° such that a top vertex of the spherical panorama image corresponds to northward and a bottom vertex of the spherical panorama image corresponds to southward.

10. The image processing system of claim 1, wherein:
  an aspect ratio of the first rectangular image is or substantially is 2:0.5; or
  an aspect ratio of the second rectangular image is or substantially is 2:0.5.

11. An image processing method implemented on a computing device having at least one processor, at least one computer-readable storage medium, and a communication platform connected to a network, comprising:
  obtaining a first image and a second image, wherein the first image is captured by a first camera lens of a panorama device and the second image is captured by a second camera lens of the panorama device;
  obtaining a first rectangular image by performing an interpolation based on a plurality of first fan-shaped images, wherein a top side of the first rectangular image corresponds to a center of the first image and each one of the plurality of first fan-shaped images is part of the first image;
  obtaining a second rectangular image by performing an interpolation based on a plurality of second fan-shaped images, wherein a bottom side of the second rectangular image corresponds to a center of the second image and each one of the plurality of second fan-shaped images is part of the second image;
  generating a fused image based on the first rectangular image and the second rectangular image; and
  mapping the fused image to a spherical panorama image.

12. The image processing method of claim 11, wherein the first camera lens and the second camera lens are arranged oppositely, the first camera lens corresponding to a forward direction and the second camera lens corresponding to a backward direction.

13. The image processing method of claim 11, wherein
  a field of view (FOV) of the first camera lens exceeds 180°, and
  a FOV of the second camera lens exceeds 180°.

14. The image processing method of claim 11, further comprising
  determining one or more location parameters of the first image, wherein the center of the first image corresponds to a forward direction, a top, a bottom, a left, and a right of the first image correspond to northward, southward, western, and eastern, respectively; and
  determining one or more location parameters of the second image, wherein the center of the second image corresponds to a backward direction, a top, a bottom, a left, and a right of the second image correspond to northward, southward, eastern, and western, respectively.

15. The image processing method of claim 14, wherein
  the top side of the first rectangular image corresponds to the forward direction;
  a bottom side of the first rectangular image corresponds to western, northward, eastern, and southward;
  the bottom side of the second rectangular image corresponds to the backward direction; and
  a top side of the second rectangular image corresponds to western, northward, eastern, and southward.

16. The image processing method of claim 11, wherein generating a fused image comprises:
  generating a stitched image by stitching a bottom side of the first rectangular image and a top side of the second rectangular image, the stitched image including a stitching region; and
  generating the fused image by fusing the stitching region of the stitched image.

17. The image processing method of claim 16, wherein the bottom side of the first rectangular image and the top side of the second rectangular image correspond to a same direction.

18. The image processing method of claim 11, wherein mapping the fused image to a spherical panorama image comprises:
  determining a mapping relationship between a two-dimensional (2D) coordinate system and a spherical coordinate system; and
  mapping the fused image to the spherical panorama image according to the mapping relationship.

19. The image processing method of claim 11, further comprising:
  rotate the spherical panorama image with 90° such that a top vertex of the spherical panorama image corresponds to northward and a bottom vertex of the spherical panorama image corresponds to southward.

20. A non-transitory computer-readable storage medium, comprising at least one set of instructions, wherein when executed by at least one processor of a computing device, the at least one set of instructions directs the at least one processor to perform acts of:

obtaining a first image and a second image, wherein the first image is captured by a first camera lens of a panorama device and the second image is captured by a second camera lens of the panorama device;

obtaining a first rectangular image by performing an interpolation based on a plurality of first fan-shaped images, wherein a top side of the first rectangular image corresponds to a center of the first image and each one of the plurality of first fan-shaped images is part of the first image;

obtaining a second rectangular image by performing an interpolation based on a plurality of second fan-shaped images, wherein a bottom side of the second rectangular image corresponds to a center of the second image and each one of the plurality of second fan-shaped images is part of the second image;

generating a fused image based on the first rectangular image and the second rectangular image; and mapping the fused image to a spherical panorama image.

* * * * *